United States Patent [19]
Bell

[11] Patent Number: 6,052,380
[45] Date of Patent: *Apr. 18, 2000

[54] NETWORK ADAPTER UTILIZING AN ETHERNET PROTOCOL AND UTILIZING A DIGITAL SUBSCRIBER LINE PHYSICAL LAYER DRIVER FOR IMPROVED PERFORMANCE

[75] Inventor: Russell W. Bell, Austin, Tex.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/744,438

[22] Filed: Nov. 8, 1996

[51] Int. Cl.[7] .................................................. H04L 12/413
[52] U.S. Cl. ............................................ 370/445; 370/484
[58] Field of Search ..................................... 370/445, 446, 370/447, 419, 420, 465, 466, 201, 203, 210, 503, 463, 482, 484, 485; 375/219, 261, 224; 395/500, 200.12, 200.15; 340/825.5

[56] References Cited

U.S. PATENT DOCUMENTS

| | | | |
|---|---|---|---|
| 4,766,591 | 8/1988 | Huang | 370/455 |
| 5,297,143 | 3/1994 | Fridrich et al. | 370/445 |
| 5,436,902 | 7/1995 | McNamara et al. | 370/447 |
| 5,608,755 | 3/1997 | Rakip | 370/201 |

FOREIGN PATENT DOCUMENTS

0577115A2   1/1994   European Pat. Off. .

OTHER PUBLICATIONS

International Search Report for PCT/US 97/20592 mailed Mar. 2, 1998.

XP-002057941 Tanenbaum, A.S., "Computer Networks" 1993, Prentice-Hall International Editions, Englewood Cliffs, U.S., pp. 141-147.

XP-002057469 Pitroff, L., et al, "Don't Foget the Physical Layer", New Electronics, No. 7, Apr. 1984, London, pp. 37-41.

Maxwell, K., "Asymmetric Digital Subscriber Line: Interim Technology for the Next Forty Years", IEEE Communications Magazine, vol. 34, No. 10, Oct. 1, 1996, pp. 100-106.

Metcalfe et al., The Ethernet Source Book, p. 277, 1985.

*Primary Examiner*—Chau Nguyen
*Attorney, Agent, or Firm*—Conley, Rose & Tayon; Jeffrey C. Hood

[57] ABSTRACT

An improved network adapter and architecture which combines the Ethernet bus access protocol with a digital subscriber line-based physical layer driver to provide improved performance. The use of a digital subscriber line-based physical layer driver, such as the DSL physical layer, in conjunction with the Ethernet protocol provides low cost and compatibility advantages associated with Ethernet in conjunction with the improved reliability, robustness, bandwidth, and noise resistance of the DSL layer. This allows standard Ethernet networking on noisy transmission media such as category 3 twisted pair, power lines, and other previously unusable channels.

20 Claims, 7 Drawing Sheets

NETWORK ADAPTER UTILIZING AN ETHERNET PROTOCOL AND UTILIZING A DIGITAL SUBSCRIBER LINE PHYSICAL LAYER DRIVER FOR IMPROVED PERFORMANCE

FIELD OF THE INVENTION

The present invention relates to networking technology, and more particularly to a local area network which utilizes the Ethernet protocol for accessing the bus, and which utilizes a digital subscriber line physical layer protocol, such as discrete multi-tone (DMT) modulation or carrierless amplitude phase (CAP) modulation methods, for improved transfer bandwidth and reliability.

DESCRIPTION OF THE RELATED ART

Computer Networks

Computer networks facilitate the interoperability of computer systems and allow a plurality of users to share various elements such as data, applications programs, peripherals, and communication links to other networks and files. A local area network (LAN) is essentially a combination of two or more personal computers or workstations that are physically and logically connected to each other. Local area networks can be interconnected to other networks in other parts of a building or in other cities, this type of configuration being commonly referred to as a wide area network or WAN.

In its simplest form, a network comprises two or more interconnected computers. The two or more interconnected computers may share data and/or applications, as well as one or more peripherals, such as a printer. A typical corporate network includes at least one dedicated file server, two or more client computers and various shared peripherals. The file server is typically not used to run application software but rather is used to service requests from the various client computers and to store files that are created by application programs executing on the client computers. The client computer provides requests to the file server for necessary files and also uses other resources of the network, such as printers and modems. Each computer or peripheral connected to the network is referred to as a "node" on the network.

Each node or computer on a network includes a network interface card, also referred to as a LAN adapter, which functions as an interface between the computer and the network cabling. The network interface card moves data to and from random access memory inside the computer and also controls the flow of data in and out of the network cabling system. The network interface card has a specialized port that matches the electrical signaling standards used on the cable and the specific type of cable connector.

OSI Reference Model

Modern networks are based on the Open Systems Interconnection (OSI) Reference Model for network compatibility and interoperability. The OSI seven layer model defines functions and protocols that enable a wide variety of network hardware and software to work together. The OSI model includes seven layers which encompass the physical network connection as well as the networking software. The seven layers of the OSI Reference Model include a physical layer, data link layer, network layer, transport layer, session layer, presentation layer, and application layer.

The physical layer is responsible for transmission of data between two points or nodes on the network. The physical layer is implemented by the network interface card and handles the physical signaling on the network, including connectors, timing voltages and other matters. The physical layer controls the speed of data on the line, rules for connecting and disconnecting the lines, rules for full duplex and half duplex transmission, and types of cable connectors. Thus the physical layer defines the type of wire, e.g., coaxial cable or twisted pair, the possible lengths and connections to the wire, the signals on the wire, and the interfaces of the cabling system.

The second layer, referred to as data link layer or logical link layer, is responsible for organizing the bits of data into packets or frames. The data link layer is also responsible for sending these frames, in sequence, to their destination and expecting an acknowledgment of save arrival of the data. If the data is not received correctly at the other end, the data link layer is responsible for retransmitting the corrupted frames of data. The data link layer may be implemented in either software or hardware.

The network layer is responsible for addressing and routing between subnetworks. The network layer determines the data destination and the route that the data should take through the network. The network layer is also responsible for reformatting a message into packets and directing it to its proper destination.

The transport layer handles the control or message data movement across the network. The transport layer defines how messages are handled, and in particular the manner in which the network reacts to packets that become lost or other errors that occur. Thus the transport layer ensures end to end, error free delivery. The transport layer also controls, addressing, routing, and alternative routings.

The session layer performs various administrative tasks and security, including encryption if desired. Session layer software manages the entire communications session by synchronizing data flow between the nodes. The session layer is also responsible for establishing and terminating a session, logging in and out, and access/security features.

The presentation layer provides for the representation of the data, including the formatting and display of data on the computer screen. The application layer is the application graphical user interface (GUI) which provides basic network services, such as file management and transfer, mail and peripheral access, such as printing.

Network Topologies and Protocols

There are various types of local area network standards and configurations available today. One choice in configuring a local area network is the network topology, i.e., the physical layout and connection of the cables between the workstations and the file servers. There are essentially two different methods for implementing a local area network, these being referred to as client/server and peer-to-peer networks. In a typical peer-to-peer network, any workstation or computer can be both a file server as well as a client searching for data or programs. A peer-to-peer network comprises a series of workstations that are usually linked together in a daisy-chain fashion, where each workstation is designated either as a client or a combination of client and server when the network is set up. A client/server network is the type of LAN most often used today. In this type of LAN, one or more central computers, referred to as file servers, are designated as central data storage locations and message handlers of the system. The remaining computer workstations are designated as clients and are all linked to the file servers.

The topology or physical layout of a local area network refers to the way in which nodes, e.g. workstations, printers, file servers and other devices, are physically connected to each other. The physical topology can take one of various forms, including a bus topology, ring topology, star topology or a hybrid topology. In a bus topology, a long cable acts as the data passageway or bus of the various nodes. The file server, workstations and other devices, such as printers, modems and faxes, are attached to the cable at different locations, and data travels to and from the workstations through the cable. In a ring topology, the workstations are connected to each other in a daisy-chain fashion and form a circle or ring. Data is transmitted from one node to the next, where each node or workstation examines data being passed along the ring. If the data is not destined for that workstation, the data is forwarded to the next workstation and so on. Since data travels in only one direction, there is no danger of data collision. However, any break in the connection of the network will cause the entire network to go down or become inoperable.

In a star topology, all of the nodes in the network are connected to a central hub to which all connections are made. The central hub is in the form of a ring topology as described above, and each node is connected to the central hub through a bus. One advantage of a star topology is that if one line becomes broken or disconnected, only that node becomes inoperable, and the remaining portion of the network remains operable. In addition to these topologies, various hybrid topologies exist which combine the features of star, ring and bus topologies.

In addition to the physical topologies described above, a network typically includes a logical topology or data transfer protocol, which defines the method of data transfer between the various nodes on the network. A data transfer protocol is necessary for networks, especially networks using a bus topology, because of the possibility that two nodes or workstations may attempt to transmit data at the same time over the common bus. In other words, a data transfer protocol is necessary in a bus topology to prevent data collision.

One popular network protocol is referred to as Ethernet, which is used for networks utilizing a bus topology. Ethernet technology was developed in the 1980s and is used in a large number of networking applications, including a large number of local area networks (LANs). The Ethernet protocol is IEEE standard 802.3.

Ethernet is based on a network protocol referred to as CSMA/CD (Carrier Sense Multiple Access/Collision Detection). The Ethernet protocol is sometimes referred to as the "cocktail party" algorithm, whereby an individual listens and waits for a silent moment before beginning to talk. If by chance, these two individuals "collide", i.e., they begin speaking at the same time, each "backs off" and allows the other person to continue. At some point, one person continues speaking (gains access to the channel) and finishes their conversation. In a similar manner, an Ethernet network interface card senses the change in voltage of the bus or cable before attempting to send a packet of data to its destination. If no voltage disruption is detected, the packet of data is transmitted down the cable toward its destination. However, if the network interface card senses the presence of data, it waits a random period of time before again attempting to send its packet of data to its destination.

The physical layer of Ethernet has been used in a variety of transmission media, including radios, coaxial cables, infrared applications, twisted pair wiring, and others. The Ethernet network protocol is mostly used in a twisted pair wiring or coaxial cable environment. The majority of Ethernet nodes use Manchester encoding at the physical layer. This scheme works well in a controlled, low noise, environment that can tolerate the inefficiency of the Manchester code (signaling rate is twice the data rate). However, in the presence of noise, or other interference, or in transmission environments that have time varying characteristics, the Ethernet physical layer may not have adequate transmission quality. In noisy environments, it is important to have a robust physical layer transport mechanism.

Digital Subscriber Line Technology—DSL

Digital subscriber line (DSL) technologies are currently being developed to more fully utilize the existing copper wire infrastructure. The new digital subscriber line technologies include ADSL (Asymmetric Digital Subscriber Line), SDSL (Symmetric Digital Subscriber Line), and HDSL (High bit-rate Digital Subscriber Line) among others. ADSL was developed by companies that supply technology to telephony service providers. ADSL is a transport technology that provides higher bandwidth services over existing copper "loop" deployed by the phone companies around the world. Due to the value of this copper, telephony equipment suppliers have developed the above new digital subscriber line technologies which require a large amount of processing or MIPS (million instructions per second) and which take advantage of the rapid pace of semiconductor development in order to provide increased bandwidth. ADSL uses digital signal processing techniques at each end of the copper loop to provide higher bandwidth and thus extend the life and bandwidth of these copper loops. Today's technology can provide data rates from 1.5 Mbps to in excess of 50 Mbps with widely varying cost and distance points.

ADSL generally uses one of two modulation schemes, these being carrierless amplitude-phase (CAP) modulation and discrete multitone (DMT) modulation. DMT modulation is a technology that divides the available bandwidth of a channel into sections. Each of these sections is "characterized" for noise and attenuation. After the characteristics of the channel are known, the transmitters and receivers can compensate for the deficiencies in the transmission path. The "bands" of the channel that are deficient receive less data to transmit, and good bands receive more data to transmit. The aggregate effect of this channelization is higher bandwidth over the channel. Typical phone lines are characterized by 4 kHz of bandwidth. Based on typical signal to noise ratios and Shannon's Theorem, the maximum capacity of the channel using conventional techniques is under 100 kbps. Using ADSL, 1.5 to 6 Mbps is possible using the same channel.

CAP modulation is also an out-of-band modulation technique which attempts to equalize the line using digital techniques. CAP modulation attempts to learn the channel characteristics and apply the inverse of these characteristics on the receive side of the channel. The net effect of this equalization is to attempt to obtain "ideal" channel response.

Therefore, a variety of advanced technologies have been developed to obtain more bandwidth from a copper-based communication channel such as twisted pair wiring. However, most of the copper-based networks are very telephone centric and are based on a classic point to point network, such as those used in the telephone company's local loop circuitry. Also, standard telephone cabling is category 3 two wire unshielded twisted pair (UTP), which is generally considered too noisy for network data traffic. Therefore, an improved networking architecture system and method is desired which allows computer networking, such as Ethernet networking, as well as improved bandwidth, over noisy environments, such as conventional telephone copper wiring.

Home Networks

PC market characteristics indicate that many home users are purchasing a second computer system. Not unlike business users, many of these consumers are not in favor of purchasing additional peripherals (printers, scanners, etc.) and would prefer to share the peripherals that they already own. Therefore, home users with two or more computers desire a networking solution.

One solution for providing networking in the home is to install specialized cables in the home, such as category 5 twisted pair or coaxial cable, to provide connectivity. However, this entails considerable trouble and expense. Two other connectivity options for a home network include internal power lines and internal phone lines. However, each of these connectivity options uses a noisy communications line which is generally deemed inadequate. Radio communication may also be used, although use of radio for this purpose has drawbacks. Therefore, an improved networking solution for a home network is desired which can use the existing telephone wiring or power line infrastructure for network communications

SUMMARY OF THE INVENTION

The present invention comprises an improved net fork architecture which combines the Ethernet bus access protocol with a digital subscriber line-based physical layer driver to provide improved performance. The use of a digital subscriber line-based physical layer driver, such as the ADSL physical layer, in conjunction with the Ethernet protocol provides low cost and compatibility advantages associated with Ethernet in conjunction with the improved reliability, robustness, bandwidth, and noise resistance of the ADSL layer. This allows standard Ethernet networking on noisy transmission media such as category 3 twisted pair, power lines, and other previously unusable channels.

The network comprises a plurality of computer systems connected by a transmission media. The transmission media may be any of various types of wiring or cabling, including standard telephony wiring, i.e., category 3 twisted pair, power lines, or other wiring or cabling. Each computer system or peripheral coupled to the network includes a network adapter or network interface card which connects to the network.

The network adapter includes an Ethernet controller for implementing at least a portion of the Ethernet protocol. The network adapter also includes a digital signal processor (DSP) which implements a digital subscriber line-based physical layer driver, such as the ADSL physical layer driver, to transmit data onto the transmission media The ADSL physical layer driver preferably uses discrete multitone (DMT) modulation or carrierless amplitude phase (CAP) modulation. The digital signal processor implementing the physical layer driver transmits data onto the transmission media based on channel characteristics of the transmission media for improved performance.

Thus the network interface card implements the Ethernet protocol, but uses the digital subscriber line-based physical layer driver instead of the normal Ethernet physical layer driver. This allows improved communications and increased bandwidth over the Ethernet network. This also allows the use of transmission media which are otherwise too noisy or unreliable for data networking, i.e., allows the use of existing copper infrastructure without rewiring expense.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Computer Network

Figure 1:
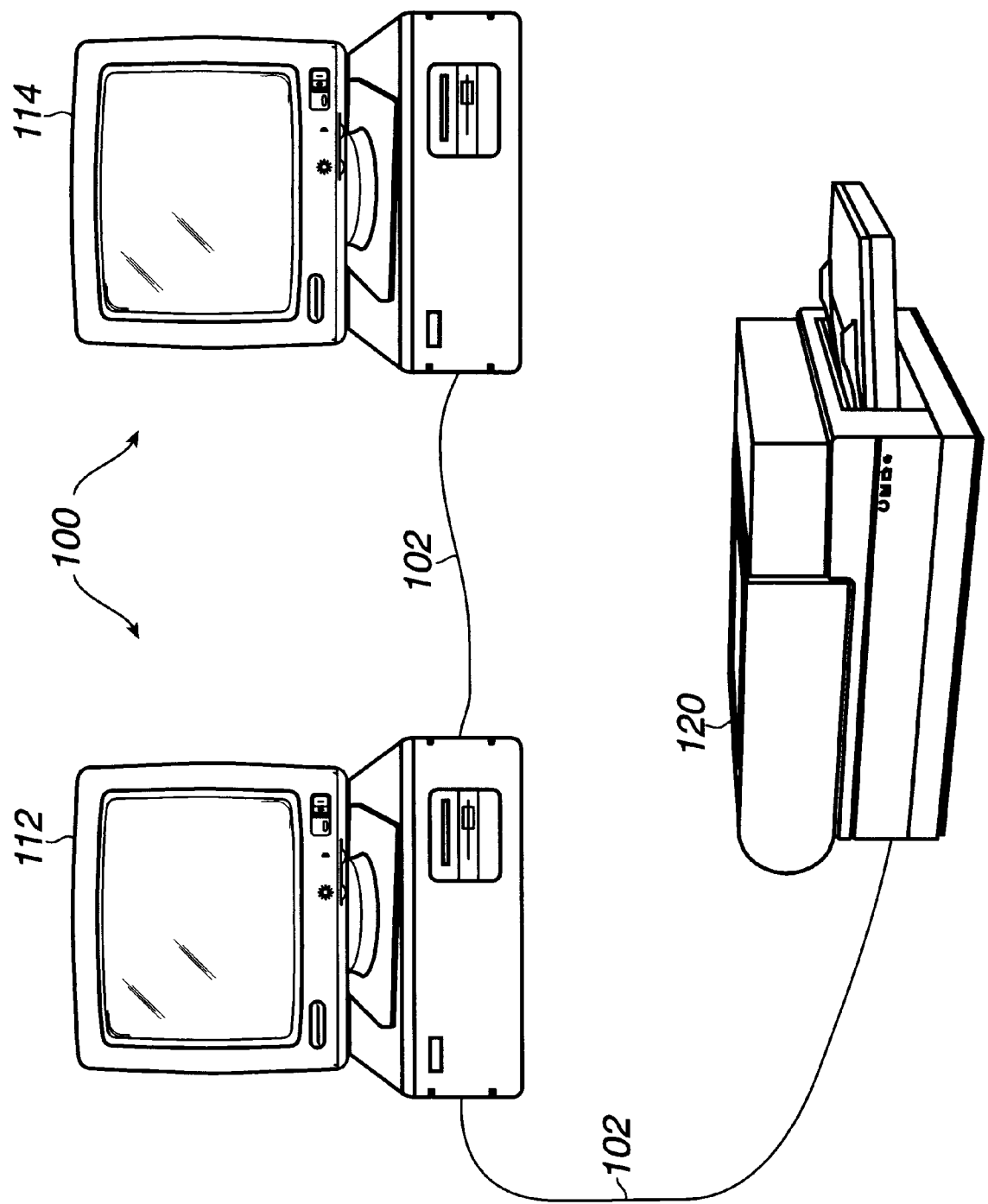
FIG. 1 illustrates a simple network according to one embodiment of the invention.

Referring now to FIG. 1, a simple computer network 100 is shown. The network 100 implements portions of a media access controller (MAC) protocol, such as the Ethernet protocol, and a digital subscriber line-based physical layer driver protocol for improved performance. This combines the low cost advantages and compatibility of the Ethernet protocol with the improved bandwidth performance of ADSL technology. In the preferred embodiment, the network 100 implements portions of the Ethernet protocol and a digital subscriber line-based physical layer driver protocol for improved performance. However, the network may implement other media access controller (MAC) protocols, including a USB MAC protocol, among others.

As shown, the network 100 includes a transmission media 102. The transmission media 102 may be any of various types. The network architecture of the present invention allows the use of existing transmission media, such as existing copper wires, which are generally too noisy for other types of networks. In the preferred embodiment, the transmission media 102 is a copper-based wiring, such as a two wire twisted pair wiring. If the network 100 is physically located in a home, the transmission media 102 may be standard telephone wiring, i.e., category 3 two wire twisted pair copper wire, which is conventionally used for telephony connection. In other words, if the network 100 is physically located in a home, the transmission media 102 may be standard telephone wiring already installed in the home. Alternatively, the transmission media 102 may be a standard power line, wherein the network uses power line carrier (PLC) techniques. The transmission media 102 may be any of various other types of network cabling, such as category 5 twisted pair, coaxial cable, or optical fiber, among others.

The network 100 includes two or more computers 112 and 114. Each of the computer systems 112 and 114 is coupled to the transmission media and is adapted for transmitting data onto the transmission media 102. Each of the computer systems 112 and 114 includes various standard components, including a central processing unit, one or more buses and memory. One or more peripherals, such as printer 120, may be connected to the transmission media 102 as separate nodes on the network and receive data from multiple computers. Peripheral 120 may also be connected to a port, such as a parallel port or USB interface, of one of the computer systems.

Each of the computers 112 and 114 includes a network adapter according to the present invention for coupling to the transmission media. Peripheral devices 120 which directly couple to the transmission media 102 also include a network adapter according to the present invention. In the following description, it is presumed that peripheral device 120 is coupled to a port of a computer system, such as computer system 112, and thus peripheral device 120 does not include a separate network adapter.

As described farther below, the network adapter comprised in the computer systems 112 and 114 implements at least a portion of the Ethernet protocol and implements a digital subscriber line-based physical layer driver to transmit data onto the transmission media 102. This enables each of the computer systems 112 and 114 to transmit data onto the transmission media 102 based on channel characteristics of the transmission media for improved performance.

As noted above, the transmission media 102 may comprise a noisy transmission line, such as standard telephone wiring (category 3 unshielded twisted pair) or a power line. The network of the present invention operates to adapt to noise characteristics of the transmission media to provide improved data communication on the transmission media 102.

It is noted that a power line contains a relatively large amount of noise and is unsuitable for most modulation and transmission schemes. However, the DSL physical layer driver has robust characteristics which allow the power line to be used for network traffic.

In an embodiment where the transmission media 102 is a two-wire twisted pair telephone line, the computer systems 112 and 114 are operable to transmit data on the transmission media 102 at substantially the same time as normal telephony voice communications on the transmission media 102. This is due to the out-of-band nature of DSL, which operates to modulate data on a portion of the frequency band outside of the voice range. Thus, both telephony voice and network data communications can occur on the transmission media 102 at the same time. This enables the telephone line to not be "busy", i.e., allows the home (or office) user to place and receive telephone calls, while using the telephone line for network data traffic. Thus, the use of a DSL physical layer for a home-area-network allows data and voice to coexist on the same cabling at the same time. This allows telephone conversations to occur while data files are being moved inside the home.

Network Interface Card

Figure 2:
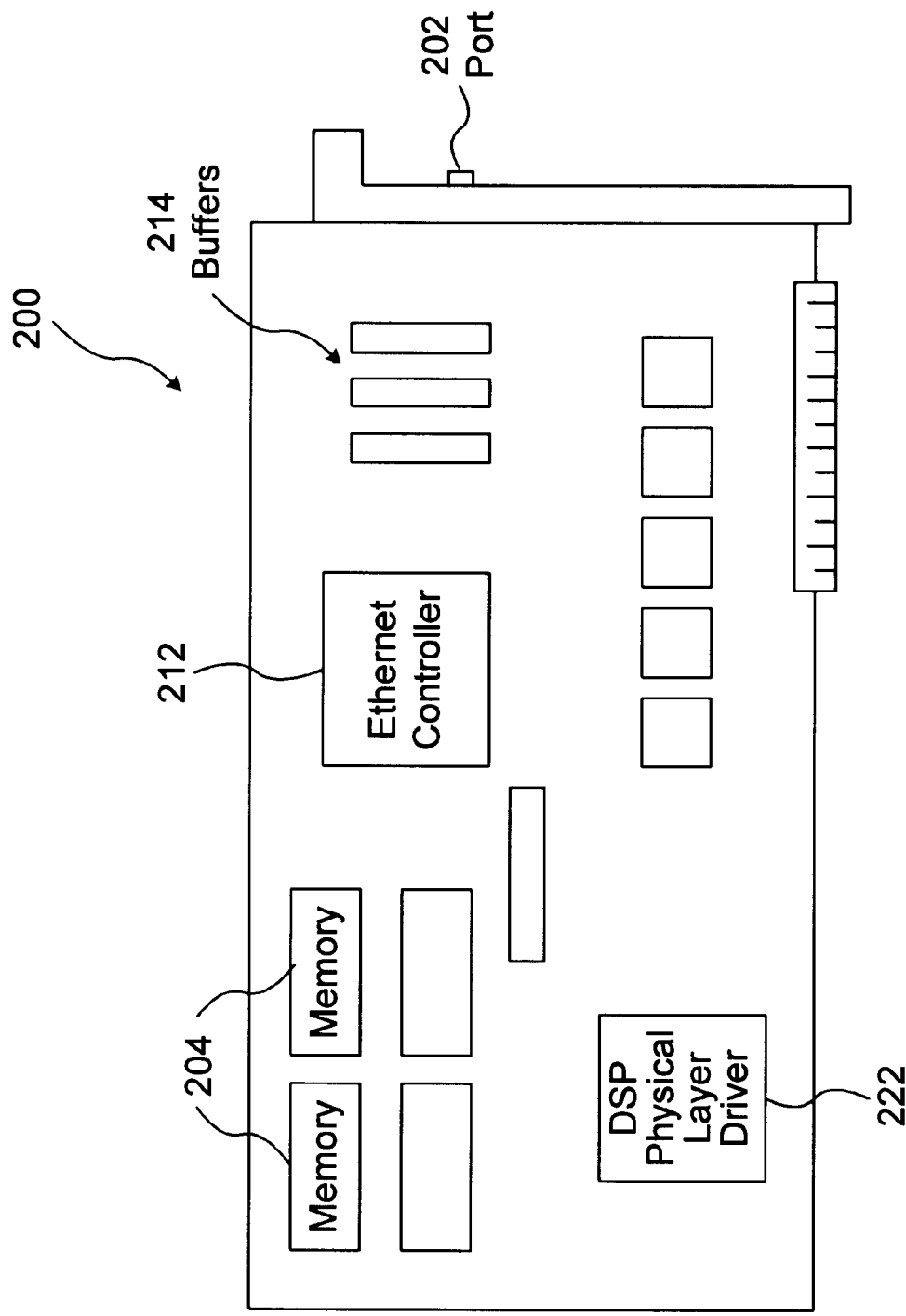
FIG. 2 illustrates a network interface card comprised in the computer systems of FIG. 1, wherein the network interface card implements the Ethernet protocol and uses a digital subscriber line based physical layer driver, such as ADSL discrete multitone (DMT) or carrierless amplitude phase (CAP) modulation.

Referring now to FIG. 2, a network interface card 200 is shown according to the present invention. As shown, the network interface card 200 includes a port 202 for coupling to transmission media. The network interface card 200 includes an Ethernet controller 212 for implementing at least a portion of the Ethernet protocol. The Ethernet controller 212 implements a collision sense multiple access (CSMA) protocol for initiating accesses onto the transmission media. For more information on the Ethernet protocol, please see "Computer Networks" by Andrew S. Tannenbaum, Prentice Hall, 1988, which is hereby incorporated by reference in its entirety.

The network interface card 200 includes one or more buffers 214 for storing data to be transmitted through the port 202 onto the transmission media 102, and for receiving and storing data received from the port 202 from the transmission media 102.

The network interface card 200 also includes a digital signal processor (DSP) 222 which implements a digital subscriber line-based physical layer driver to transmit/receive data onto the transmission media 102. The digital signal processor 222 transmits data onto the transmission media 102 based on channel characteristics of the transmission media 102 for improved performance. Thus the network interface card 200 uses the digital subscriber line-based physical layer driver instead of the normal Ethernet physical layer driver. This allows improved communications and increased bandwidth over the Ethernet network and allows use of existing wiring infrastructures.

The digital signal processor 222 is coupled to the Ethernet controller 212, and the digital signal processor 222 operates to transmit data onto the transmission media 102 when the Ethernet controller 212 indicates that the transmission media 102 is available. Thus the network interface card 200 uses at least a portion of the Ethernet protocol for bus access. However, the network interface card 200 does not use the Ethernet physical layer driver, but rather uses a digital subscriber line-based physical layer driver. This provides greater bandwidth and better resistance to noise, thus allowing the use of existing copper wiring infrastructures which have more noisy transmission media.

The network adapter 200 further includes memory 204 for storing code and data The memory 204 stores code executable by the Ethernet controller 212 for enabling the Ethernet controller 212 to implement at least a portion of the Ethernet network protocol. The memory 204 also stores code and data used by the DSP 222 for enabling the DSP 222 to implement the digital subscriber line-based physical layer driver. The network adapter 200 includes various other logic typically comprised in network interface cards, as is well known in the art.

As noted above, the network interface card 200 includes DSP 222 which implements a digital subscriber line-based physical layer driver to transmit/receive data onto the transmission media 102. In the preferred embodiment, the logic circuitry which implements the digital subscriber line-based physical layer driver is preferably DSP 222. However, it is noted that any of various types of logic circuitry or programmable processor may be used. In the present disclosure, the term "digital signal processor" is intended to include any of various types of discrete digital and/or analog logic, programmable logic, or programmable processor, including a general purpose CPU or DSP, among other types of logic.

The digital subscriber line-based physical layer driver uses a Digital Subscriber Line (DSL) technique, such as ADSL (Asymmetric Digital Subscriber Line) techniques, SDSL (Symmetric Digital Subscriber Line) techniques, and/or HDSL (High bit-rate Digital Subscriber Line) techniques, among others, to achieve increased bandwidth and improved communication on a noisy channel. The digital subscriber line-based physical layer driver preferably uses DSL techniques, such as discrete multi-tone (DMT) modulation or carrierless amplitude (CAP) modulation, to transmit data onto the transmission media 102. Thus the DSP 222 is preferably programmed to use either DMT or CAP modulation in the physical layer driver.

In the preferred embodiment, the network interface card 200 uses DMT modulation. In this embodiment, the digital signal processor 222 operates to partition at least a portion of the available bandwidth of the transmission media channel 102 into a plurality of sections, wherein each of these plurality of sections has a characteristic signal to noise ratio (SNR) and/or noise attenuation. The digital signal processor 222 is operable to determine the characteristics of each of the plurality of sections and provides data onto the transmission media 102 based on the determined characteristics. For more information on the DSL physical layer driver of the preferred embodiment, please see U.S. Pat. No. 5,479, 447 titled "Method and Apparatus for Adaptive, Variable Bandwidth, High-Speed Data Transmission of a Multicarrier Signal Over Digital Subscriber Lines", which is hereby incorporated by reference as though fully and completely set forth herein. For other information on the DSL physical layer driver, please see Daniel Minoli, "Video Dialtone Technology", McGraw-Hill, Inc. 1995, which is hereby incorporated by reference in its entirety.

Home Network

As mentioned above, in one embodiment, the network of the present invention is configured in a home or other location using standard telephone wiring. In this embodiment, since most homes have multiple phone outlets, computer systems and peripherals are connected to telephone outlets in different rooms via the existing telephone lines. This provides the ability to use existing wiring in the home, and thus no additional wiring is required. In other words, this solution leverages the huge installed base of telephone wiring and equipment.

Since both DMT and CAP based technologies are based on modulation techniques that are out-of-band, they can operate concurrently with telephone conversation without creating interference. Thus computer systems and peripherals can communicate while telephone conversations are in progress. Also, any protocol can run on top of this DMT or CAP based physical layer once the channels have been initialized. In the preferred embodiment, an Ethernet media access controller (MAC) is executed on top of this DMT/CAP physical layer.

Figure 3:
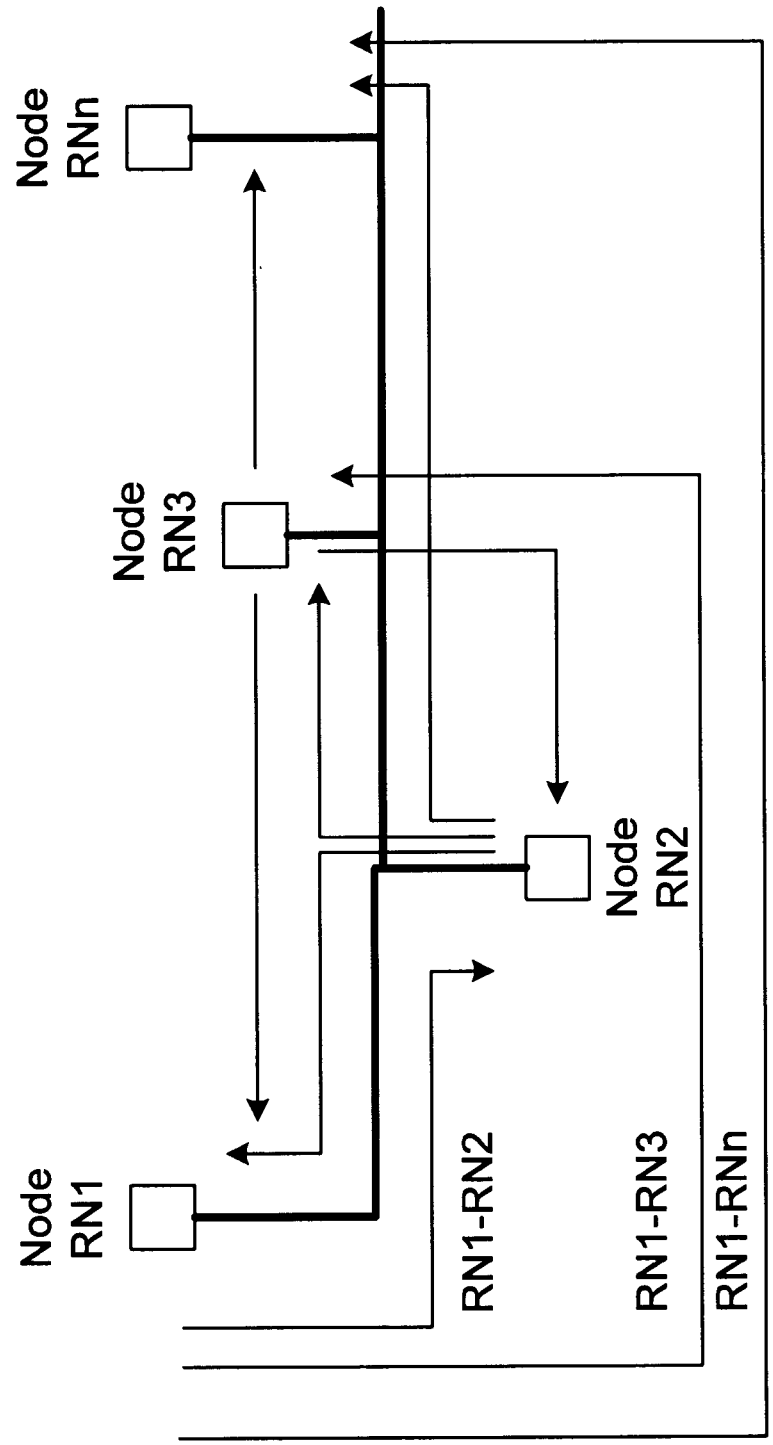
FIG. 3 illustrates virtual point-to-point links in a data network.

As mentioned above, most of the existing DMT or CAP based physical layer drivers are targeted towards a point-to-point network. However, as shown in FIGS. 1 or 3, most home area networks are multi-point networks. Therefore, the present invention includes a novel system and method which enables a physical layer driver, which is primarily designed for a point-to-point network, to operate in a multi-point to multi-point network. In the preferred embodiment, and in the discussion below, the network uses a DMT-based physical layer.

DMT Background

As mentioned above, DMT modulation is a technology that divides the available bandwidth of a channel into sections. Each of these sections is "characterized" for noise and attenuation. After the characteristics of the channel are known, the transmitters and receivers can compensate for the deficiencies in the transmission path. The "bands" of the channel that are deficient receive less data to transmit, and good bands receive more data to transmit. The aggregate effect of this channelization is higher bandwidth over the channel. As mentioned above, the DMT algorithm is primarily designed for a point-to-point channel. The preferred embodiment of the invention provides an initialization sequence and enhancements to allow for operation over a multipoint network typical in businesses and potentially the home market. For more information on DMT modulation, please see U.S. Pat. No. 5,479,447 referenced above.

Multi-Point Access Protocol Operation

Referring now to FIG. 3, a multi-point network is shown which includes a plurality of nodes. As shown, the network can be considered as a series of point-to-point networks. The point-to-point networks or "virtual networks" listed below exist inside the physical network of FIG. 3.

FIG. 3—Point-To-Point Links:

RN1 to RN2
RN2 to RN3
RN3 to RN1
RN2 to RN1
RN3 to RN2
RN1 to RN3

Each of these "links" is analogous to a single point-to-point link used by the telephone company for connection of their loop equipment, although the distances between nodes is considerably smaller in a home area network. The network of the present invention uses the standard DMT algorithm in conjunction with the multi-point initialization and access protocol described herein to provide multi-point operation of a DMT-based (or other) physical layer driver in conjunction with a local area network. In the preferred embodiment, the network is an Ethernet based network.

The multi-point initialization and access protocol of the preferred embodiment operates to map out all of the characteristics of the communications paths between each of the point-to-point links in a multi-point network. In the following discussion, the multi-point access protocol is described using the example three node network of FIG. 3 outlined above. The multi-point access protocol is not limited to operation with three nodes, but rather is generic and can be extended to operate in multi-node networks without any modifications. Once each of the point-to-point paths 'characteristics' have been established, communications can occur between each of the nodes using the appropriate characteristics for each link.

Figure 5:
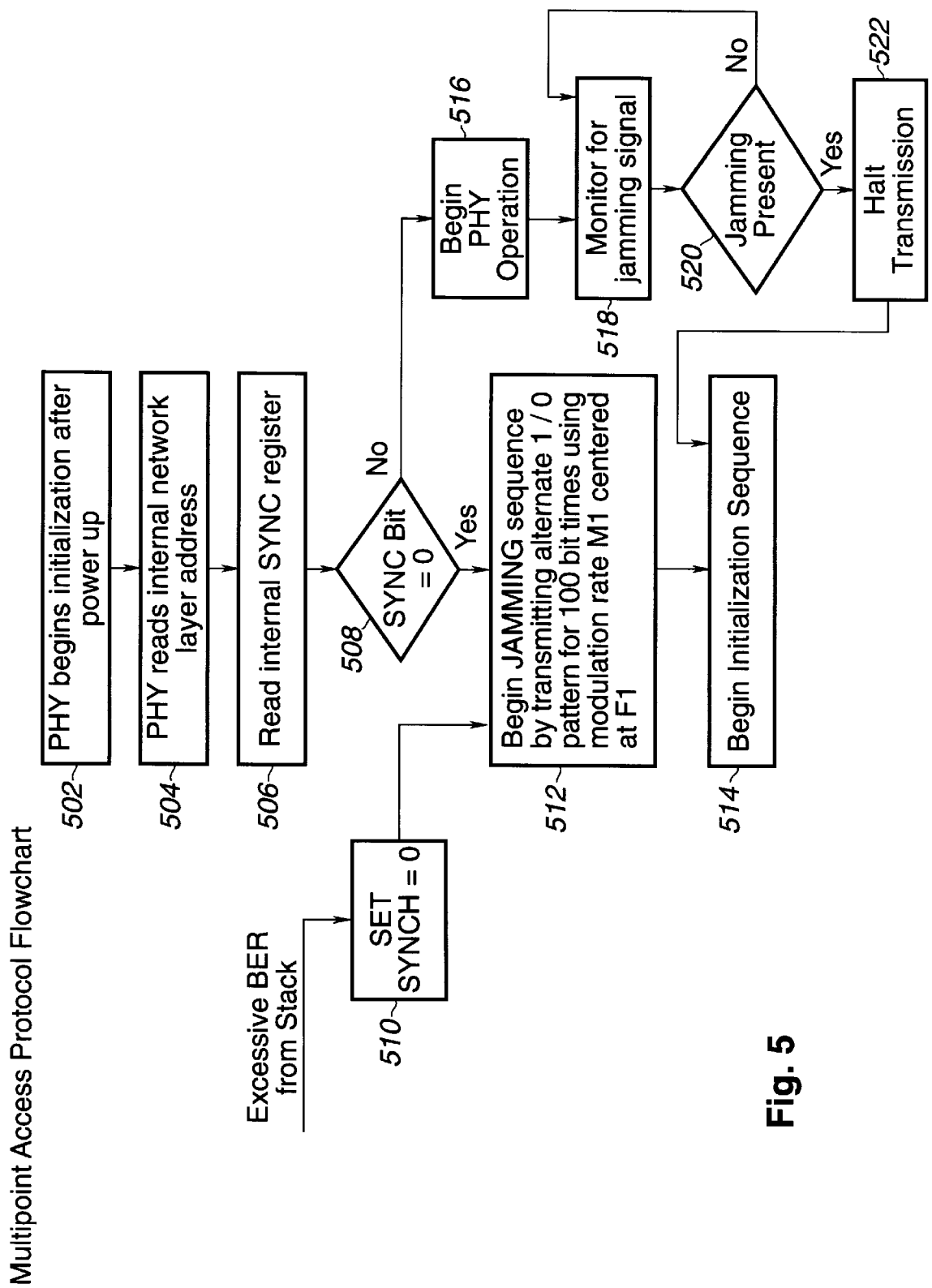
FIGS. 5–7 are flowchart diagrams illustrating start-up and initialization sequences of nodes on a network according to the present invention.
Figure 6:
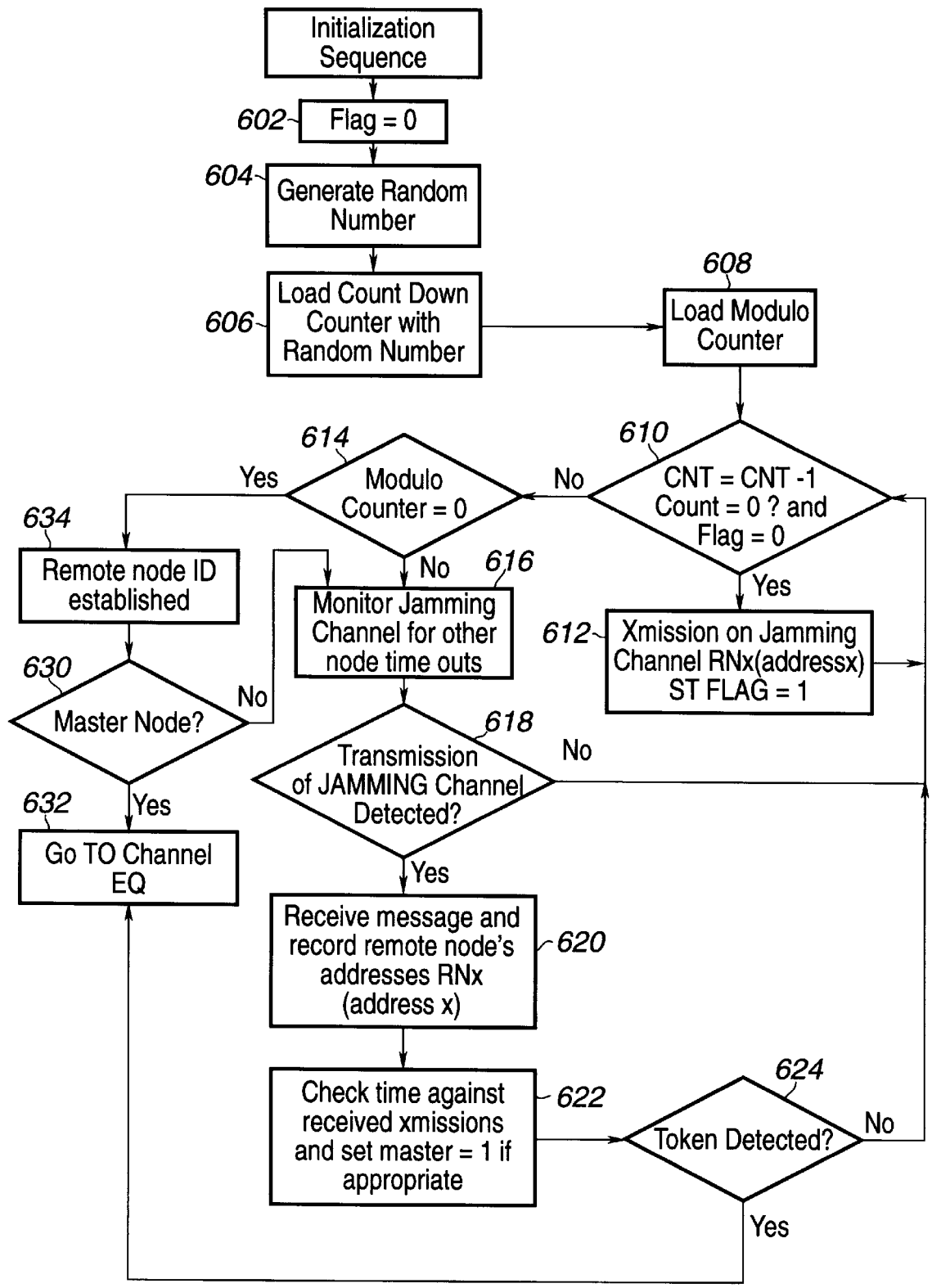
Figure 7:
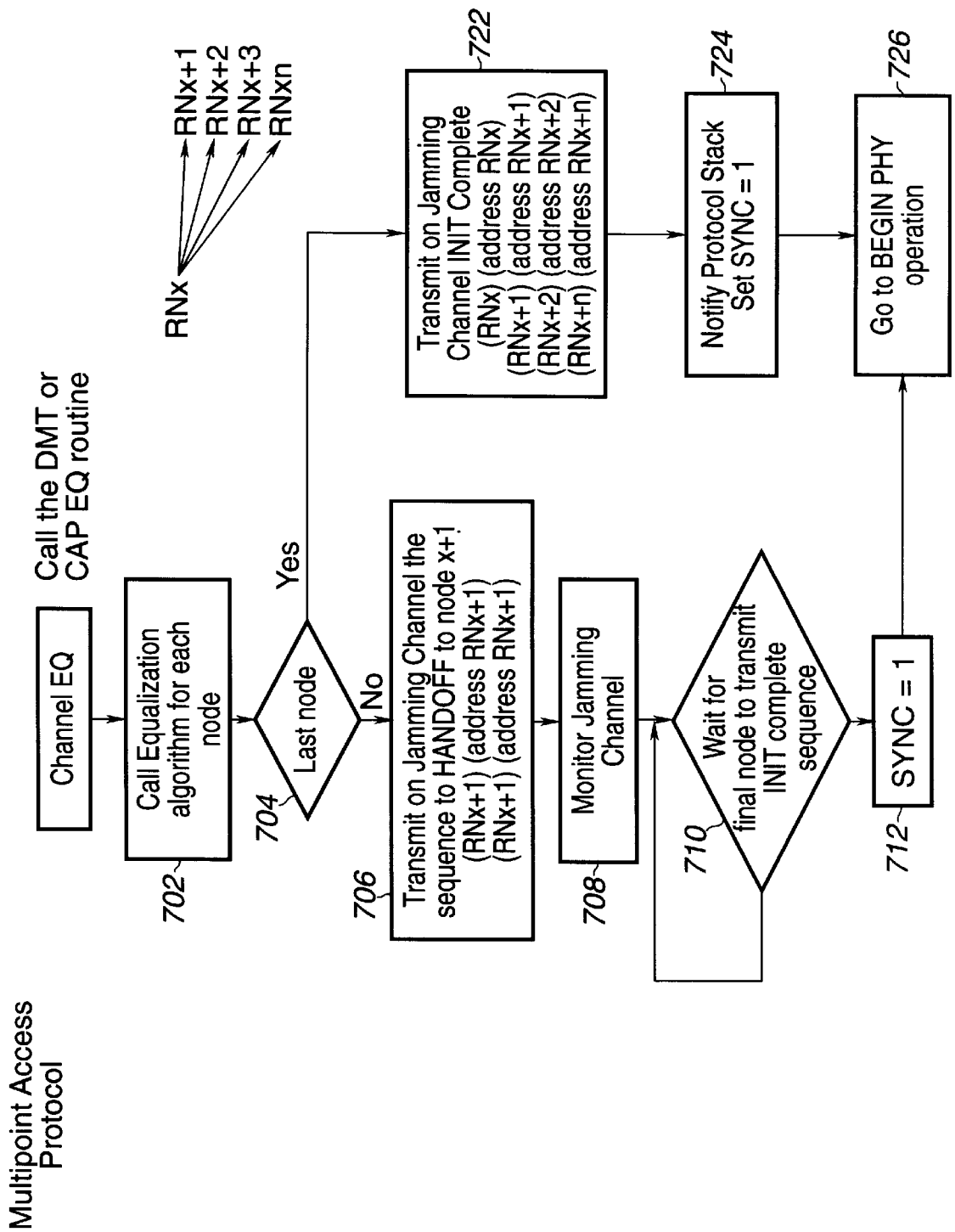

FIGS. 5–7: Flowchart Diagrams

Referring now to FIGS. 5–7, flowchart diagrams are shown illustrating operation of the multi-point access initialization protocol for each of the nodes on the network. As shown in FIG. 5, in step 502 each node, or the physical layer driver comprised in each node, referred to as "PHY" in FIG. 5, 'wakes up' after power-up or just after being connected to the multi-node network. The node knows nothing except its own internal address. In step 504 the node determines its internal address. In step 506 the node reads a Sync bit in an internal register to see if it is "synchronized" with the network, i.e., to see if the node has already performed an initialization in this network. If this bit is determined to be low in step 508, indicating the node is not synchronized, the node begins a synchronization sequence. A logical one in the Sync bit indicates that the node "knows" the equalization parameters for each virtual point-to-point link in the network for which it has access.

If the Sync bit is determined to be low in step 508, in step 512 the node begins a jamming sequence at a predetermined frequency and a predetermined signal pattern. In the preferred embodiment, the node uses an alternating one zero pattern (101010 . . . ) for 100 bit times transmitted in an 1 kHz modulation of an FM carrier centered around 100 kHz. Any other nodes on the network will constantly monitor this jamming signal. Once the other nodes have detected this jamming signal, they complete the transmission of the current packets and they enter an initialization mode or initialization sequence, ceasing any further transmission until all of the virtual point-to-point links have been initialized. The initialization sequence is represented as step 514 and is illustrated in FIG. 6.

As shown in FIG. 6, upon the entering of the initialization mode or sequence, in step 602 each node sets a flag to 0, indicating the initialization sequence has begun. In step 604, each node generates a random number and in steps 606 and 608 each node starts two counters, respectively. In step 606 each node starts a count down timer that is loaded with the random number generated in step 604. In step 608 each nodes starts a modulo counter that is set to the maximum time that would be required for all of the nodes on the network to complete their initialization transmissions. Typically, the size of the modulo counter is equal to the maximum possible size of the random number.

Figure 4:
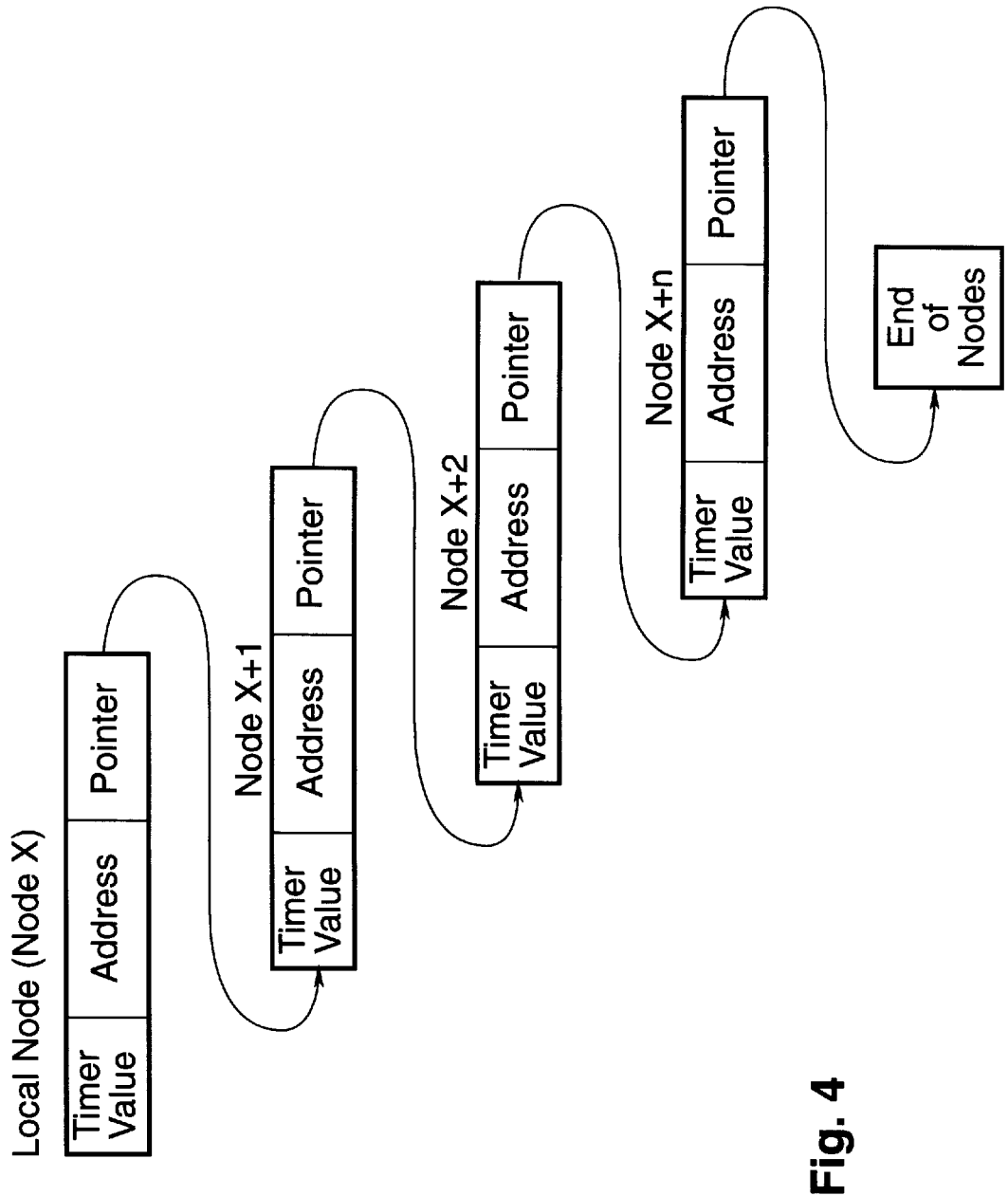
FIG. 4 illustrates data structures created during initialization of nodes on the network.

Upon expiration of a node's random number timer, as determined in step 610, the appropriate node begins to transmit a specialized header using the jamming channel in step 612. The header contains: RNx (timer value node x) (address x). FIG. 4 illustrates the data structures that are transferred, as discussed further below. This address is seen by every node on the network and is transmitted on the same frequency as the jamming signal.

Each respective mode also monitors the jamming channel for other node timeouts in step 616. This monitoring for other node timeouts in step 616 occurs until the modulo counter expires as determined in step 614. Thus when the random number timer expires on another node, this other node also transmits a signal on the jamming channel that contains its timer value and address. When each of the other nodes detects transmission on the jamming channel by another node in step 618, each of the other nodes record this address and timer value in step 620. In this manner, all of the nodes record all of the addresses and timer values of the other nodes on the network.

After a node records an address and timer value in step 620, in step 622 the node checks its timer against received transmissions and sets a master bit to 1, if appropriate, i.e., if the respective node's timer has not yet expired. Thus, a respective node checks the timer value of every other node and sets a master value to 1 if the timer value of the respective node is greater than the timer values of other nodes received on the jamming channel. The master bit set for a respective node indicates that the respective node has the largest timer value and is thus the last to transmit. Thus, after a certain period of time, and before the modulo counter expires, each node on the network has its timer expire, and each respective node transmits its timer value and address for the remaining nodes to "hear" and record.

As mentioned above, each node also monitors its modulo counter in step 614. After the modulo timer has wrapped, which indicates that there can be no other nodes on the network that have not yet timed out and transmitted their timer values and addresses, then each node on the network is now aware of every other node on the network.

After the modulo counter expires in step 614, in step 634 remote node Ids are established. After step 634, the respective node determines if it is the master node. If the respective node is not the master node in step 630, then operation returns to step 616, and the node continues to monitor the jamming channel for other node time outs. If the node is the master node, then channel equalization is performed in step 632. The channel equalization performed in step 632 is described further with respect to FIG. 7.

The last node to transmit determines that it is the last node when the modulo timer wraps. At this point, each node knows a timer value and an address for every other node. The "last node" to transmit compares its timer value with the timer values that it has "heard" on the network and it will realize that it has the highest value timer and is therefore the last node to transmit. After the last timer has expired and the master node has been determined in step 630, then channel equalization is performed in step 632.

Referring now to FIG. 7, the preferred embodiment includes a channel equalization method which allows the DSL physical layer in each of the nodes to know the transmission characteristics of each of the paths between each of the nodes. FIG. 7 illustrates the channel equalization step 632 referenced in FIG. 6. As shown in FIG. 7, the channel equalization is performed or called for each node in step 702. In the preferred embodiment, the first node that "timed out" (the Master node) begins the initialization process. The channel equalization process preferably comprises using a DMT (discrete multi-tone) initialization sequence to determine the characteristics of the one-way point-to-point channel between each node. It is noted that other initialization sequences may be used, as desired.

The flowchart of FIG. 7 is described below using the example of FIG. 3. Here it is assumed that the Master node is RN1. The RN1 node uses the DMT (or equivalent) initialization sequence between RN1 and RN2 and RN1 and RN3. RN1 stores these channel characteristics in the PHY device. In any subsequent communications between RN1 and RN3, the appropriate channel characteristics will be used. At this point, RN1 has completed its initialization and channel characterization.

After this channel equalization is performed as indicated in step 704, in step 706 the RN1 node generates a special HAND-OFF frame that is transmitted on the jamming channel. The frame has the bit pattern RN2, RN2 (the transmission of RN2's address twice in succession). This frame instructs RN2 that it is time for RN2 to determine the characteristics of the channels RN2 to RN1 and RN2 to RN3. RN2 uses the DMT (or equivalent) channel characteristics algorithm and "learns" the characteristics of the point to point links between RN2 and RN1 and RN2 and RN3. At this point RN2 has completed the initialization sequence. The RN2 node stores these channel characteristics which will be used in the future in any communications between RN2 and RN1 or RN3. RN2 now sends out a special frame RN3, RN3. RN3 receives this frame and begins the sequence described above. RN3 determines the characteristics of the links RN3 to RN1 and RN3 to RN2. RN3 stores these characteristics. It is noted that all jamming channel transmissions labeled as RNx comprise the frame illustrated in FIG. 4. This frame comprises the initial value of the random number generated by RNx followed by the internal address of RNx.

If node 3 has not seen an additional transmission between its initialization sequence and the expiration of the modulo timer, then node 3 (RN3) is the last node in the chain. Node 3 recognizes that it is the last node on the link based on timer values. At this point, Node 3 transmits a special pattern on the jamming channel: RN1 RN2 RN3, allowing every other node to recognize that the multi-point link is now initialized and every node is now aware of every other node. Furthermore, every point-to-point link has been characterized using a DMT based algorithm and high speed communications are now ready to begin. This instructs node three to transmit the initialization complete sequence of RN1 RN2 RN3.

As mentioned above, the first node whose random number timer reaches zero is designated as the Master Node. This node recognizes it is the master node as it will not have seen any transmission from any other node when its timer expires. Therefore, it will have the lowest timer value and this information is transmitted to all other nodes as part of the initialization sequence (along with the real address of this node).

For algorithmic purposes, each of the nodes uses the internal suffix 'x' for it's designator. The linked list shown in FIG. 4 is used by the initialization software to traverse the network topology. Using the three node network example, this linked list comprises three entries, where each entry represents one of the nodes on the network. At each local node, the intelligence can recognize the entry in the data structure that is associated with the local node based on the address and the timer value. This linked list is re-linked with the head node designated to be the local node. Subsequent initialization algorithms can simply traverse the list to assist in the location of each of the virtual point-to-point segments.

Once the end point or null pointer is reached, the local intelligence in each node recognizes that it has completed the initialization necessary to establish the channel characteristics for each of the virtual point-to-point links.

After the initialization sequence is performed for all nodes, than all of the nodes can begin to communicate with each other using a variety of types of media access controllers (MACs), including Ethernet.

If an Ethernet protocol is used, collisions can occur on the transmission media. Since a DSL physical layer driver is being used, the physical layer may not be aware of the local collisions. This is because there is not a collision detection mechanism analogous to the DC offset caused in a Manchester encoded physical layer, which is typically used by Ethernet, when two signals collide. In other words, if multiple nodes or computers both attempt to transmit data at the same time, corrupted data may result on the line. This will normally generate a DC blip in a pure Ethernet network, but will not generate a DC blip in a system which uses a DSL physical layer.

In one embodiment of the invention, each node in the system uses higher layers in the protocol stack to resolve the collisions and retransmit the data that was impacted. Also, if the bit error rate (BER) exceeds some threshold, or the upper layers in the protocol stack continue to receive corrupted packets, they can communicate with their appropriate physical layer driver to begin a "reinitialize" sequence that resets each of the nodes on the link via the jamming channel. Similarly, if two or more of the nodes generate identical random numbers, there is a finite possibility that the nodes may attempt to initialize the channels at the same time. It is likely that the results of this channel characterization will be unpredictable and will result in unstable operation. The higher layer protocol stacks will detect this mis-operation in the form of lost packets, higher bit error rates, etc., and can force the link to resynchronize. It is unlikely that multiple nodes will select the same random number on iterative attempts at initialization.

In another embodiment, the initialization scheme described above is modified to use dedicated bands of frequencies between each of the point-to-point links. This method is similar to the above initialization scheme, but includes an additional step during the token pass of RNx, RNx in which the hand off of initialization is passed from node x-1 to node x. If an additional field was added at the time of hand-off, the actual operating frequencies that were used during the channel equalization process could be passed to node x. Node x could choose to avoid operating at these frequencies during its initialization process. Likewise, node x could update this field when it passes the initialization token to node RNx+1. During the initialization sequence, node RN x+1 would initialize assuming that the frequencies transmitted in the USED FREQ field were not available and would initialize accordingly. This would allow multiple simultaneous channels to operate over the same network, although, since the total bandwidth is shared, the speeds would be slower. Also, the protocol could be modified to negotiate how much total bandwidth is available over the system.

Thus, in one embodiment, the network interface card 200 operates to allocate different frequency bands for transfers between different nodes. Thus, for data transfers between a first computer and a second computer, the DSP 222 allocates a first subset of frequency bands or chips. For data transfers between the second computer and a third computer, the DSP 222 allocates a second subset of frequency bands or chips. Thus, in this embodiment, the network interface card 200 implements "collisionless" Ethernet. Each of the devices has a dedicated channel. This operates to prevent data collisions and actually allows network traffic between different nodes simultaneously.

It is noted that the data rates defined by DSL in its current form are not mandatory for operation in the network system of the present invention. Tradeoffs between data rates, transmission distance, semiconductor cost, power consumption, etc., are all possible, thus improving the cost-effectiveness for a physical layer. Also, as Ethernet MAC protocols are inherently half-duplex, there is no need for elaborate echo cancellation for the simultaneously operating reverse channel that is present in standard DSL. However, this scheme does not prohibit the operation of DSL in conjunction with fill duplex Ethernet.

Therefore, the networking technology of the present invention combines the best of xDSL and Ethernet. The use of the Ethernet protocol provides low cost advantages associated with the economies of scale attributed to the huge installed base of Ethernet devices in the PC market. The use of the DSL physical layer driver provides increased bandwidth in noisy environments, and semiconductor process technology allows the combination of this technology to be useful in a variety of applications.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A network adapter for a first node of a multi-point network, comprising:
    a port for coupling to a transmission media having a plurality of other nodes coupled thereto;
    an Ethernet controller coupled to the port for implementing at least a portion of the Ethernet protocol, wherein the Ethernet controller implements a collision sense multiple access (CSMA) protocol for initiating accesses onto the transmission media;
    one or more buffers for storing data to be transmitted through the port onto the transmission media, and for receiving and storing data received from the port from the transmission media; and
    a digital signal processor coupled to the port, wherein the digital signal processor implements a digital subscriber line physical layer driver for transmitting/receiving data on the transmission media, and wherein the physical layer driver begins a jamming sequence at a predetermined frequency and with a predetermined signal pattern if not synchronized with the multi-point network.

2. The network adapter of claim 1, wherein the physical layer driver performs channel equalization between the first node and each of the plurality of other nodes.

3. The network adapter of claim 1, wherein the digital signal processor operates to perform discrete multi-tone operations to transmit/receive data on the transmission media.

4. The network adapter of claim 1, wherein the digital signal processor operates to perform carrierless amplitude phase (CAP) operations to transmit/receive data on the transmission media.

5. The network adapter of claim 3, wherein the discrete multi-tone operations include: (i) partitioning at least a portion of the available bandwidth of the transmission media channel into a plurality of sections, wherein each of the plurality of sections has a characteristic noise and attenuation, and (ii) determing the noise and attenuation characteristics of each of the plurality of sections.

6. The network adapter of claim 1, further comprising:
   memory for storing code and data, wherein the memory stores code executable by the Ethernet controller for enabling the Ethernet controller to implement at least a portion of the Ethernet network protocol.

7. The network adapter of claim 1, wherein the digital signal processor is coupled to the Ethernet controller, and wherein the digital signal processor operates to transmit/receive data on the transmission media when the Ethernet controller indicates that the transmission media is available.

8. A computer system forming a first node of a multi-point network, comprising:
   a central processing unit;
   memory coupled to the CPU for storing code and data;
   at least one bus, and
   a network adapter coupled to the bus and adapted for interfacing the computer system to a computer network, the network adapter comprising:
      a port for coupling to a transmission media having a plurality of other nodes coupled thereto;
      an Ethernet controller coupled to the port for implementing at least a portion of the Ethernet protocol, wherein the Ethernet controller implements a collision sense multiple access (CSMA) protocol for initiating accesses onto the transmission media;
      one or more buffers for storing data to be transmitted through the port onto the transmission media, and for receiving and storing data received from the port from the transmission media; and
      a digital signal processor coupled to the port wherein the digital signal processor implements a digital subscriber line physical layer driver for transmitting/receiving data on the transmission media, and wherein the physical layer driver begins a jamming sequence at a predetermined frequency and with a predetermined signal pattern if not synchronized with the multi-point network.

9. The network adapter of claim 8, wherein the physical layer driver performs channel equalization between the first node and each of the plurality of other nodes.

10. The computer system of claim 8, wherein the digital signal processor comprised in the network adapter operates to perform discrete multi-tone operations to transmit/receive data on the transmission media.

11. The computer system of claim 8, wherein the digital signal processor operates to perform carrierless amplitude phase (CAP) operations to transmit/receive data on the transmission media.

12. The computer system of claim 10, wherein the discrete multi-tone operation include: (i) partitioning at least a portion of the available bandwidth of the transmission media channel into a plurality of sections, wherein each of the plurality of sections has a characteristic noise add attenuation, and (ii) determining the noise and attenuation characteristics of each of the plurality of sections.

13. The computer system of claim 8, wherein the network adapter further comprises:
   memory for storing code and data, wherein the memory stores code executable by the Ethernet controller for enabling the Ethernet controller to implement at least a portion of the Ethernet network protocol.

14. The computer system of claim 8, wherein the digital signal processor is coupled to the Ethernet controller, and wherein the digital signal processor operates to transmit/receive data onto the transmission media when the Ethernet controller indicates that the transmission media is available.

15. A network, comprising:
   a transmission media;
   a first computer system including a central processing unit and memory, wherein the first computer system is coupled to the transmission media and is adapted for transmitting data onto the transmission media;
   a plurality of other computer systems each including a central processing unit and memory; wherein each of the plurality of other computer systems is coupled to the transmission media and is adapted for transmitting data onto the transmission media;
   wherein the fit and each of the plurality of other computer systems includes a network adapter for coupling to the transmission media, the network adapter comprising:
      a port for coupling to the transmission media;
      an Ethernet controller coupled to the port for implementing at least a portion of the Ethernet protocol, wherein the Ethernet controller implements a collision sense multiple access (CSMA) protocol for initiating accesses onto the transmission media;
      one or more buffers for storing data to be transmitted through the port onto the transmission media, and for receiving and storing data received from the port from the transmission media; and
      a digital signal processor coupled to the port, wherein the digital signal processor implements a digital subscriber line physical layer driver for transmitting/receiving data on the transmission media, and wherein the physical layer driver begins a jamming sequence at a predetermined frequency and with a predetermined signal pattern if not synchronized with the multi-point network.

16. The network of claim 15, wherein The transmission media comprises an internal power line.

17. The network of claim 15, wherein the transmission media is a two-wire twisted pair telephone line, wherein the first and second computer systems are operable to transmit/receive voice and data on the transmission media at substantially the same time.

18. The network of claim 15, further comprising:
   one or more peripherals coupled to the transmission media performing input/output functions.

19. A network adapter for a first node of a multi-point network, comprising:
   a port for coupling to a transmission media having a plurality of other nodes coupled thereto;
   an Ethernet controller coupled to the port for implementing at least a portion of the Ethernet protocol;
   one or more buffers for storing data to be transmitted rough the port onto the transmission media, and for receiving and storing data received from the port from the transmission media; and
   a digital signal processor coupled to the port, wherein the digital signal processor implements a digital subscriber line physical layer driver for transmitting/receiving data on the transmission media, and wherein the physical layer driver begins a jamming sequence at a predetermined frequency and with a predetermined signal pattern if not synchronized with the multi-point network.

20. The network adapter of claim 19, wherein the digital signal processor operates to perform discrete multi-tone operations to transmit/receive data on the transmission media, and wherein the discrete multi-tone operations include: (i) partitioning at lest a portion of the available bandwidth of the transmission media channel into a plurality of sections, wherein each of the plurality of sections has a characteristic noise and attenuation, and (ii) determining the noise and attenuation characteristics of each of the plurality of sections.

* * * * *

UNITED STATES PATENT AND TRADEMARK OFFICE
CERTIFICATE OF CORRECTION

PATENT NO. : 6,052,380

DATED : April 18, 2000

INVENTOR(S) :
Russell W. Bell

It is certified that error appears in the above-identified patent and that said Letters Patent is hereby corrected as shown below:

In the Claims:

Claim 8, col. 15, line 34, please delete "port" and substitute --port,--.

Claim 12, col. 15, line 57, please delete "add" and substitute --and--.

Claim 15, col. 16, line 11, please delete "memory;" and substitute --memory,--.

Claim 15, col. 16, line 15, please delete "fit" and substitute --first--.

Claim 19, col. 16, line 55, please delete "rough" and substitute --through--.

Claim 20, col. 17, line 3, please delete "lest" and substitute --least--.

Signed and Sealed this

Sixth Day of March, 2001

*Attest:*

NICHOLAS P. GODICI

*Attesting Officer*

*Acting Director of the United States Patent and Trademark Office*